US012686251B2

(12) United States Patent
Chen et al.

(10) Patent No.: US 12,686,251 B2
(45) Date of Patent: Jul. 21, 2026

(54) FRONT WINDSHIELD AND AUTOMOBILE

(71) Applicant: FUYAO GLASS INDUSTRY GROUP CO., LTD., Fuqing (CN)

(72) Inventors: Zhixin Chen, Fuqing (CN); Jinliang Guan, Fuqing (CN); Bingming Jiang, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 380 days.

(21) Appl. No.: 18/584,460

(22) Filed: Feb. 22, 2024

(65) Prior Publication Data

US 2024/0217314 A1    Jul. 4, 2024

Related U.S. Application Data

(63) Continuation of application No. PCT/CN2021/128770, filed on Nov. 4, 2021.

(51) Int. Cl.
*B60J 1/02* (2006.01)

(52) U.S. Cl.
CPC ...................................... *B60J 1/02* (2013.01)

(58) Field of Classification Search
CPC ........................................................ B60J 1/02
See application file for complete search history.

(56) References Cited

U.S. PATENT DOCUMENTS

| | | | |
|---|---|---|---|
| 2019/0225534 A1 | 7/2019 | Fedullo et al. | |
| 2020/0398646 A1* | 12/2020 | Mujcinovic | B32B 17/10761 |
| 2022/0380248 A1* | 12/2022 | Li | B60R 11/00 |
| 2024/0278625 A1* | 8/2024 | Shang | B32B 7/023 |

(Continued)

FOREIGN PATENT DOCUMENTS

| | | |
|---|---|---|
| CN | 109304907 A | 2/2019 |
| CN | 111409314 A | 7/2020 |
| CN | 111703151 A | 9/2020 |

(Continued)

OTHER PUBLICATIONS

The first office action issued in corresponding KR application No. 10-2024-7003529 dated Nov. 24, 2025.

(Continued)

*Primary Examiner* — Faye M Fleming
(74) *Attorney, Agent, or Firm* — Scully, Scott, Murphy & Presser, P.C.

(57) ABSTRACT

A front windshield and an automobile are provided in embodiments. The front windshield is operable in cooperation with a LiDAR system inside the automobile. The LiDAR system is configured to emit and/or receive P-polarized light towards the front windshield. A wavelength $\lambda$ of the P-polarized light ranges from 800 nm to 1600 nm. The front windshield includes an outer glass layer, an inner glass layer, and an intermediate adhesive film. The intermediate adhesive film is between the outer glass layer and the inner glass layer. The front windshield has a signal transmission region. The P-polarized light is incident on the signal transmission region at an angle of incidence (AOI) $\theta$ of 0.942 rad to 1.222 rad. The signal transmission region has a transmittance greater than or equal to 83% for the P-polarized light incident on the signal transmission region.

20 Claims, 7 Drawing Sheets

(56)                 References Cited

U.S. PATENT DOCUMENTS

2024/0300206 A1 * 9/2024 Chen .................. B32B 17/1022
2026/0042281 A1 * 2/2026 Aoki ........................ B32B 1/00

FOREIGN PATENT DOCUMENTS

| | | | | |
|---|---|---|---|---|
| CN | 111761894 A | 10/2020 | | |
| CN | 113238378 A | 8/2021 | | |
| CN | 111409314 B | * 11/2021 | ............... | B32B 9/04 |
| CN | 118748984 A | * 10/2024 | ............. | C23C 14/35 |
| EP | 3434472 A1 | * 1/2019 | ....... | B32B 17/10293 |
| FR | 3105943 A1 | 7/2021 | | |
| WO | 2021009347 A1 | 1/2021 | | |

OTHER PUBLICATIONS

The first office action issued in corresponding CN application No. 202180100677.0 dated Feb. 18, 2025.
International Search Report dated Dec. 27, 2021 received in International Application No. PCT/CN2021/128770.
Extended European search report dated Sep. 6, 2024 received in European Patent Application No. 21934546.9.

\* cited by examiner

100

110
120

200

110

120

θ

O

FRONT WINDSHIELD AND AUTOMOBILE

CROSS-REFERENCE TO RELATED APPLICATION

This application is a continuation of International Application No. PCT/CN2021/128770, filed on Nov. 4, 2021, and the entire disclosure of which is hereby incorporated by reference in its entirety.

TECHNICAL FIELD

The disclosure relates to the technical field of automobiles, and in particular to a front windshield and an automobile.

BACKGROUND

With the continuous improvement of people's living standards, automobiles are becoming more and more popular, and how to ensure the driving safety of the automobiles becomes an important issue to be solved urgently. Currently, radar systems are normally mounted to the automobiles to assist drivers in safe driving. For example, according to the "Automobile Driving Automation Classification" standard, the autonomous driving levels are classified as L0 (emergency assistance), L1 (partial driving assistance), L2 (combined driving assistance), L3 (conditionally autonomous driving), L4 (highly autonomous driving), and L5 (fully autonomous driving). At present, the prevailing consensus in the industry is that automobiles at or above Level L2 must be equipped with a light detection and ranging (LiDAR).

The laser light emitted by the LiDAR used by the automobile has a wavelength of 905 nm and 1550 nm. The laser light excels in maintaining focus over long distances without divergence, but this characteristic hinders its ability to bypass obstacles, resulting in that the laser light may be significantly interfered in weather such as rain, fog, and sandstorms, and may even become inoperable. Therefore, the LiDAR needs to be fully integrated inside the automobile (specifically on an inner surface of the front windshield) instead of outside the automobile as in the related art. However, the laser light emitted/received by the LiDAR inside the automobile needs to pass through the front windshield. Both the 905 nm and 1550 nm wavelengths fall within the near-infrared spectrum. However, an existing windshield glass has a relatively high blocking rate for near-infrared rays to enhance thermal comfort inside the automobile, which results in a low transmittance of the front windshield for the laser light with the wavelengths of 905 nm and 1550 nm, failing to satisfy the operational requirements of the LiDAR.

SUMMARY

Embodiments of the disclosure provide a front windshield and an automobile to ensure normal operation of a light detection and ranging (LiDAR) and improve detection precision of the LiDAR.

A front windshield is provided. The front windshield is mountable to an automobile and operable in cooperation with a LiDAR system inside the automobile. The LiDAR system is configured to emit and/or receive P-polarized light, where a wavelength λ of the P-polarized light ranges from 800 nm to 1600 nm. The front windshield includes an outer glass layer, an inner glass layer, and an intermediate adhesive film between the outer glass layer and the inner glass layer. The front windshield has a signal transmission region. The P-polarized light is incident on the signal transmission region at an angle of incidence (AOI) θ ranging from 0.942 rad to 1.222 rad. The signal transmission region has a transmittance greater than or equal to 83% for the P-polarized light incident on the signal transmission region. The signal transmission region has a relative tinted coefficient $\alpha_{(\lambda)}$ less than or equal to 0.06 for the P-polarized light incident at the AOI θ, where $\alpha_{(\lambda)}=(TL_{(380\ nm\ to\ 780\ nm)}-TL_{(\lambda)})/TL_{(380\ nm\ to\ 780\ nm)}$, $TL_{(380\ nm\ to\ 780\ nm)}$ is a transmittance of the signal transmission region for P-polarized light of 380 nm to 780 nm, and $TL_{(\lambda)}$ is a transmittance of the signal transmission region for the P-polarized light with the wavelength λ.

In an embodiment, the signal transmission region has a relative tinted coefficient less than or equal to 0.04 for P-polarized light incident at an AOI of 0 rad.

In an embodiment, the wavelength λ of the P-polarized light is equal to 905 nm, and the relative tinted coefficient $\alpha_{(905\ nm)}$ is less than or equal to 0.028.

In an embodiment, a maximum change rate $K_1$ of the relative tinted coefficient $\alpha_{(905\ nm)}$ and the AOI θ satisfy $K_1=0.006*\theta+0.008$.

In an embodiment, the wavelength λ of the P-polarized light is equal to 1550 nm, and the relative tinted coefficient $\alpha_{(1550\ nm)}$ is less than or equal to 0.035.

In an embodiment, a maximum change rate $K_2$ of the relative tinted coefficient $\alpha_{(1550\ nm)}$ and the AOI θ satisfy $K_2=0.02*\theta+0.002$.

In an embodiment, the front windshield further includes a thermal insulation coating or an electric heating coating. Thermal insulation coating or the electric heating coating is positioned between the outer glass layer and the inner glass layer. The thermal insulation coating or the electric heating coating is disposed outside the signal transmission region.

In an embodiment, the front windshield includes the thermal insulation coating and has a total solar transmittance less than or equal to 50%. Alternatively, the front windshield includes the electric heating coating and has a heating power density greater than or equal to 400 W/m².

In an embodiment, the intermediate adhesive film is made of at least one of polyvinyl butyral, ethylene vinyl acetate copolymer, or a sentry glass plus (SGP).

In an embodiment, both the outer glass layer and the inner glass layer are made of ultra-clear glass, a total iron content of the ultra-clear glass is less than or equal to 0.015 wt %, and a visible light transmittance of the ultra-clear glass is greater than or equal to 91%.

In an embodiment, the intermediate adhesive film defines a first through hole facing the signal transmission region, the first through hole is not filled with any material or is filled with an infrared high-transmittance material, and the infrared high-transmittance material includes at least one of ethylene vinyl acetate copolymer, polyolefin thermoplastic elastomer, polycarbonate, or polymethyl methacrylate.

In an embodiment, the signal transmission region has a relative tinted coefficient less than or equal to 0.02 for P-polarized light incident at an AOI of 0 rad.

In an embodiment, the outer glass layer is made of clear glass or ultra-clear glass, the inner glass layer is made of clear glass or tinted glass, and the inner glass layer defines a second through hole facing the signal transmission region. A total iron content of the clear glass is less than or equal to 0.08 wt %, and a visible light transmittance of the clear glass is greater than or equal to 88%. The total iron content of the ultra-clear glass is less than or equal to 0.015 wt %, and a visible light transmittance of the ultra-clear glass is greater than or equal to 91%. A total iron content of the tinted glass is greater than or equal to 0.5 wt %, and a visible light transmittance of the tinted glass is greater than 70%.

In an embodiment, the intermediate adhesive film defines a first through hole facing the signal transmission region, the first through hole is not filled with any material or is filled with an infrared high-transmittance material, and the infrared high-transmittance material includes at least one of ethylene vinyl acetate copolymer, polyolefin thermoplastic elastomer, polycarbonate, or polymethyl methacrylate.

In an embodiment, a central axis of the first through hole is coaxial with a central axis of the second through hole, and a distance between a wall of the second through hole and a wall of the first through hole is b, wherein $-1$ mm$\leq$b$\leq$2 mm.

In an embodiment, the wavelength $\lambda$ of the P-polarized light is equal to 905 nm, and the relative tinted coefficient $\alpha_{(905\ nm)}$ is less than or equal to 0.05.

In an embodiment, a maximum change rate $K_3$ of the relative tinted coefficient $\alpha_{(905\ nm)}$ and the AOI $\theta$ satisfy $K_3=0.015*\theta+0.0035$.

In an embodiment, the wavelength $\lambda$ of the P-polarized light is equal to 1550 nm, and the relative tinted coefficient $\alpha_{(1550\ nm)}$ is less than or equal to 0.06.

In an embodiment, a maximum change rate $K_4$ of the relative tinted coefficient $\alpha_{(1550\ nm)}$ and the AOI $\theta$ satisfy. $K_4=0.028*\theta-0.001$.

An automobile is further provided in the disclosure. The automobile includes a LiDAR system and the front windshield provided in any one of the above embodiments. The LiDAR system is inside the automobile and configured to emit and/or receive the P-polarized light.

In the automobile provided in the embodiments of the disclosure, the LiDAR system is mounted to the inside of the automobile, and the design of the front windshield in structure and material aims to reduce the absorption and reflection attenuation of the front windshield for the P-polarized light, ensuring high transmittance of the front windshield for the P-polarized light. This design prevents the operational efficiency of the LiDAR system from being adversely affected, guaranteeing the detection range of the LiDAR system and the normal operation of the LiDAR, enhancing the detection precision of the LiDAR system, and ensuring the aesthetic appearance of the automobile. In addition, the front windshield can also be cleaned by a wiper system which is intrinsic to the automobile, thereby improving the transparency of a detection light path of the LiDAR system.

BRIEF DESCRIPTION OF THE DRAWINGS

To describe technical solutions in embodiments of the disclosure or the related art more clearly, the following briefly introduces the accompanying drawings required for describing the embodiments or the related art. Apparently, the accompanying drawings in the following description only illustrate some embodiments of the disclosure. Those of ordinary skill in the art may also obtain other drawings based on these accompanying drawings without creative efforts.

Figure 5:
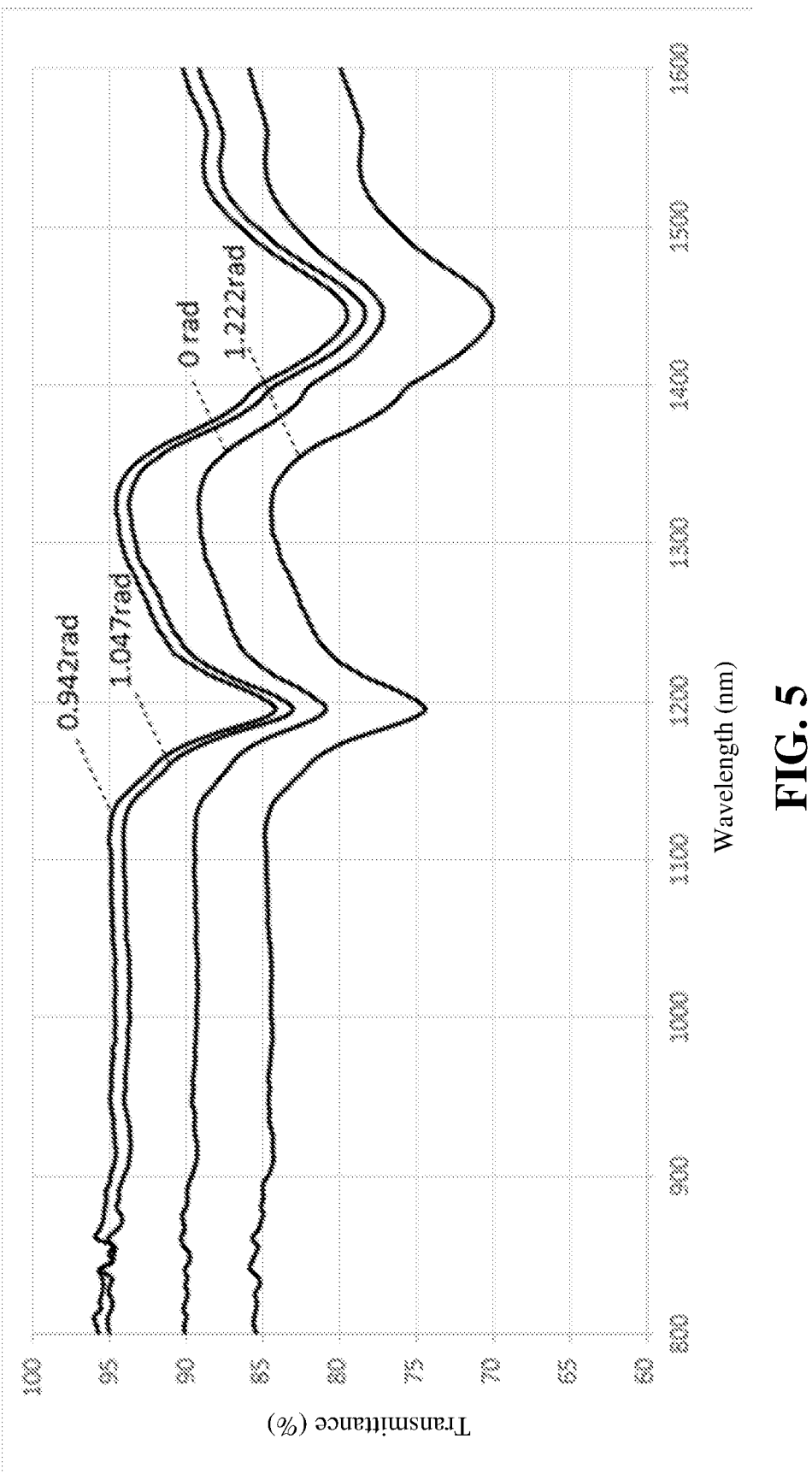

FIG. 5 illustrates curves of a transmittance of a signal transmission region of a front windshield in embodiment 1 for P-polarized light incident at various AOIs, where a wavelength of the P-polarized light ranges from 800 nm to 1600 nm.

Figure 1:
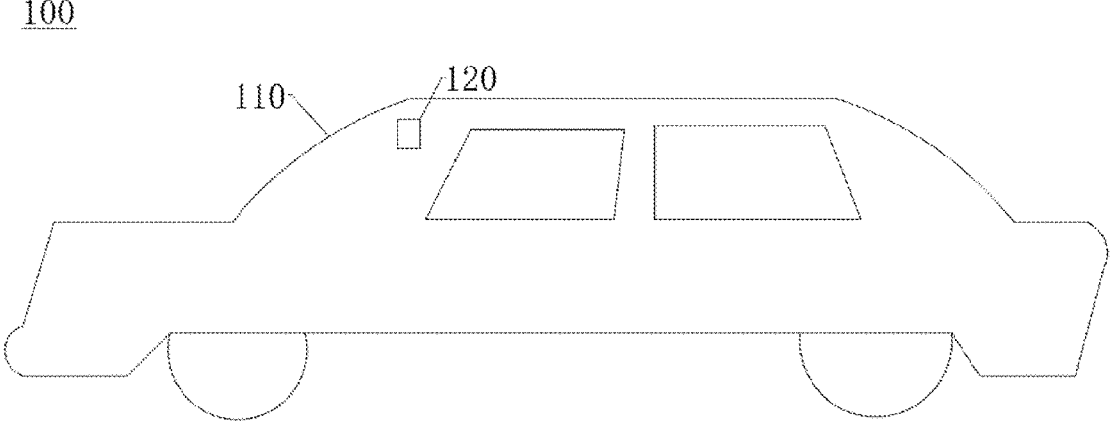
FIG. 1 is a schematic structural diagram of an automobile provided in embodiments of the disclosure.
Figure 6:
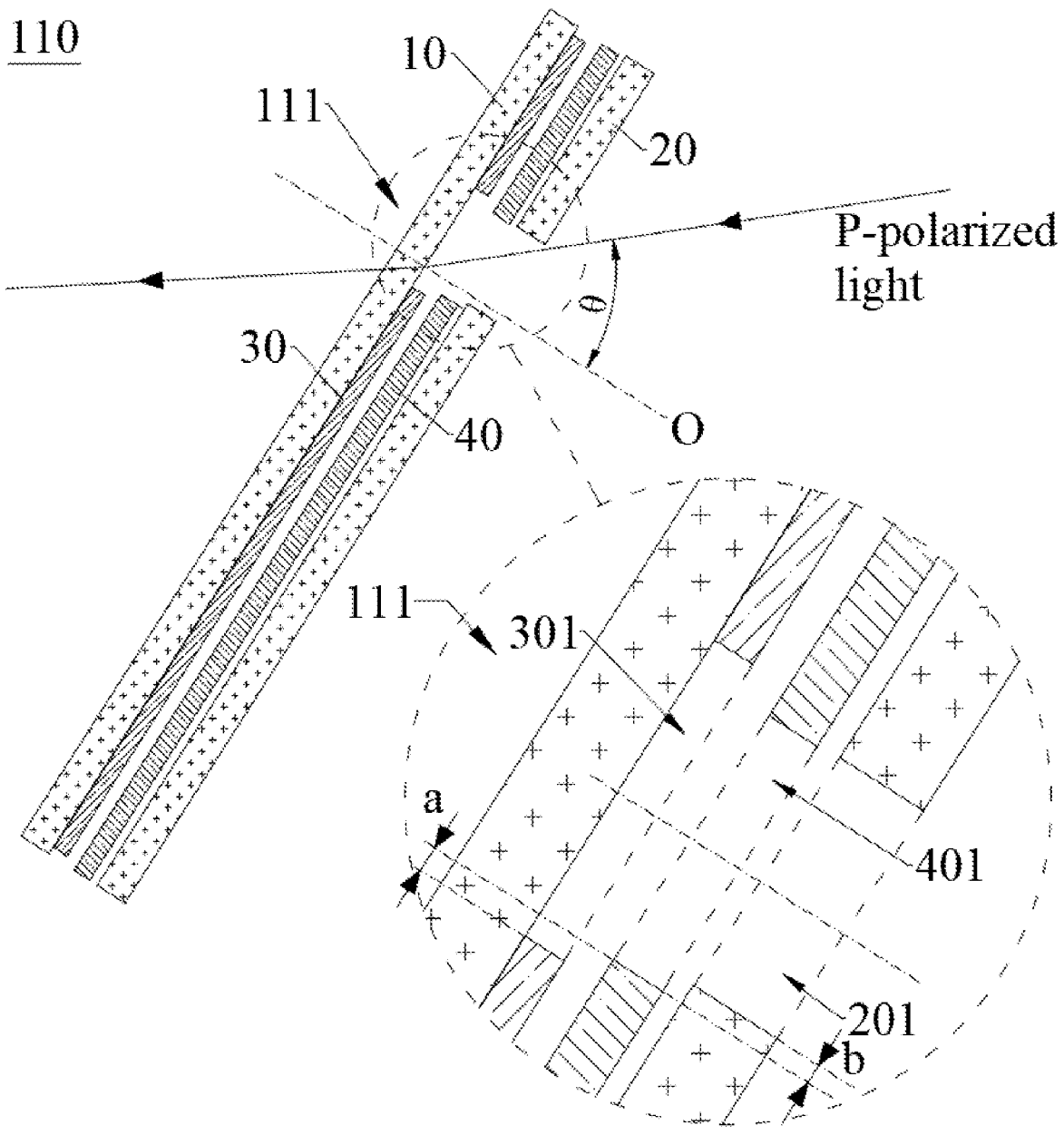

FIG. 6 is a schematic cross-sectional structural view of the front windshield in FIG. 1 according to another embodiment.

Figure 7:
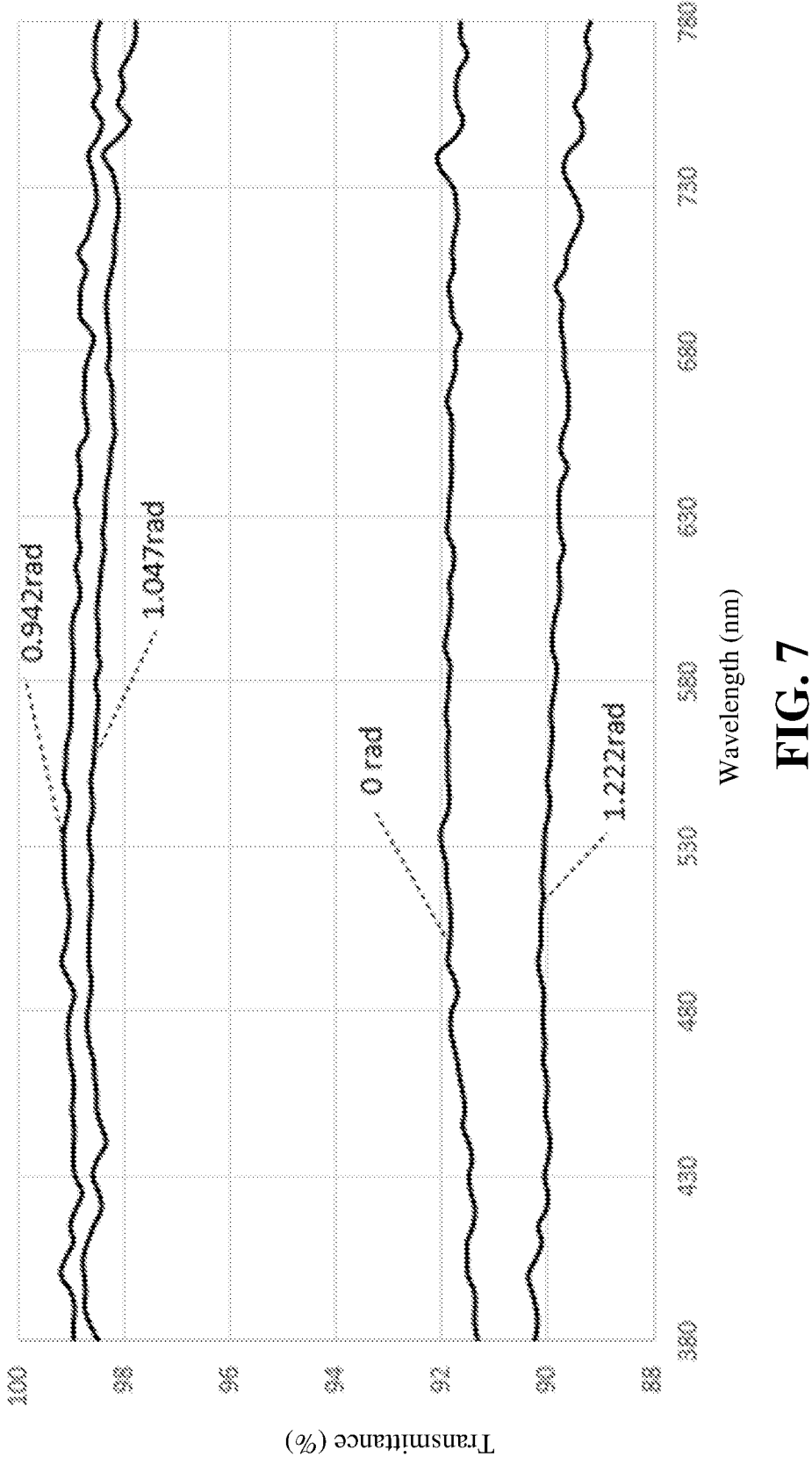

FIG. 7 illustrates curves of a transmittance of a signal transmission region of a front windshield in embodiment 4 for P-polarized light incident at various AOIs and curves of a transmittance of a signal transmission region of a front windshield in embodiment 6 for P-polarized light incident at various AOIs, where a wavelength of the P-polarized light ranges from 380 nm to 780 nm.

Figure 8:
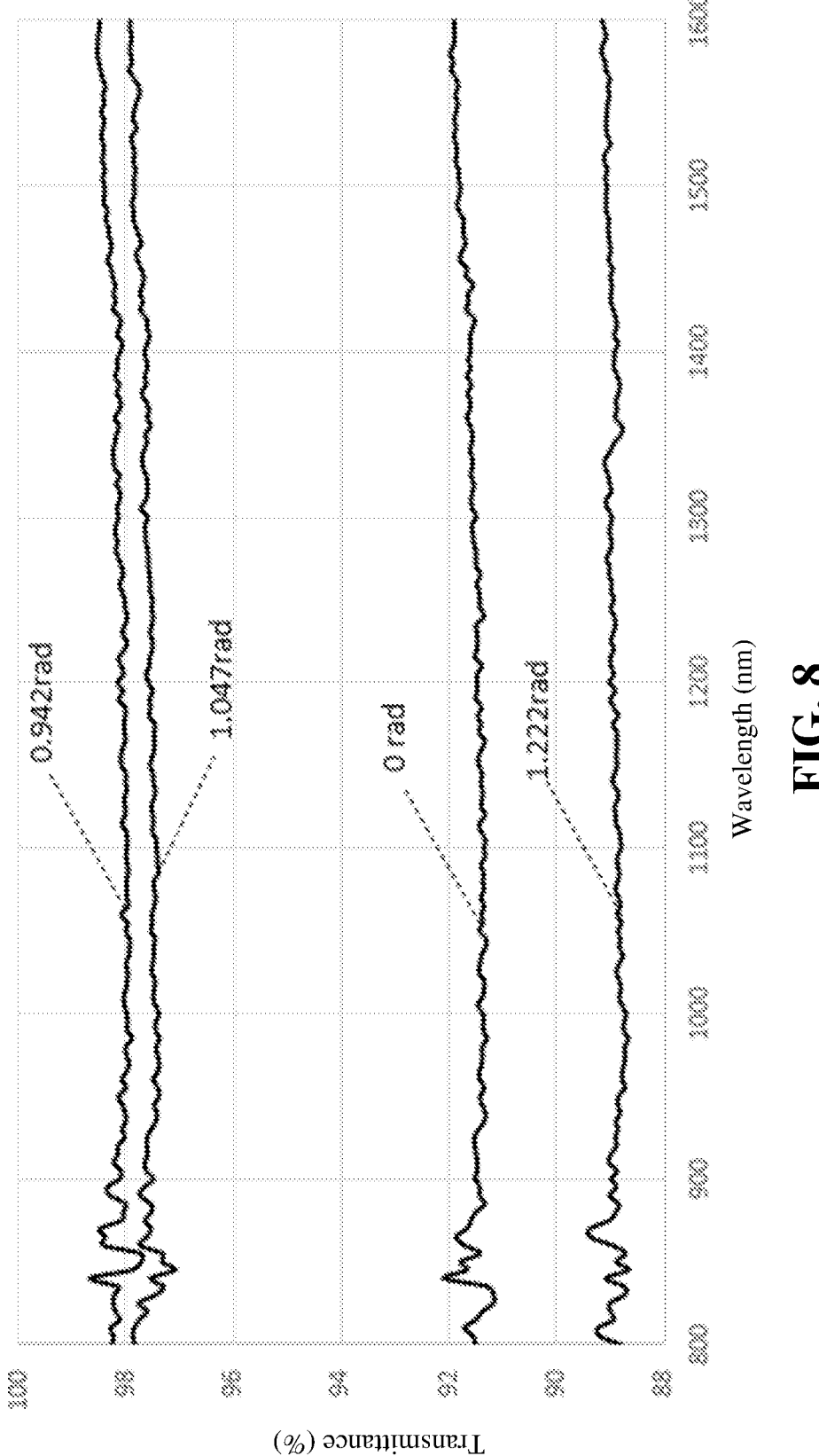

FIG. 8 illustrates curves of a transmittance of a signal transmission region of a front windshield in embodiment 4 for P-polarized light incident at various AOIs and curves of a transmittance of a signal transmission region of a front windshield in embodiment 6 for P-polarized light incident at various AOIs, where a wavelength of the P-polarized light ranges 800 nm to 1600 nm.

DETAILED DESCRIPTION

Embodiments of the disclosure are described in the following with reference to the accompanying drawings in the embodiments of the disclosure.

Refer to FIG. 1, which is a schematic structural diagram of an automobile according to an embodiment of the disclosure.

In the embodiments of the disclosure, an automobile 100 is provided. The automobile 100 includes a front windshield 110 and a LiDAR system 120. The LiDAR system 120 is inside the automobile 100. Specifically, the LiDAR system 120 is mounted to the inside of the automobile 100. For example, the LiDAR system 120 may be mounted near an inner rear-view mirror (not illustrated) of the automobile 100. Alternatively, the LiDAR system 120 may be mounted on an inner surface of the front windshield 110. Alternatively, the LiDAR system 120 may be mounted on a body frame of the automobile 100. The LiDAR system 120 includes a laser emitter and a receiver. The laser emitter is configured to emit laser light towards the front windshield 110 for detection. The laser light may pass through the front windshield 110 for the detection of a target object. The target object can reflect part of the laser light, and part of the laser light reflected by the target object may then pass through the front windshield 110 to be received by the receiver. The laser light emitted by the laser emitter is P-polarized light that has undergone polarization processing. The P-polarized light is near-infrared light, and a wavelength of the P-polarized light ranges from 800 nm to 1600 nm. For example, the wavelength of the P-polarized light may be 850 nm, 905 nm, 1060 nm, or 1550 nm, etc.

In addition, a field of view of the laser light emitted by the laser emitter ranges from $-60$ degrees to 60 degrees in the horizontal direction, and from $-15$ degrees to 10 degrees in the vertical direction. An angle between a central emission direction of the laser emitter and the horizontal plane ranges from 0 degrees to 30 degrees.

Figure 2:
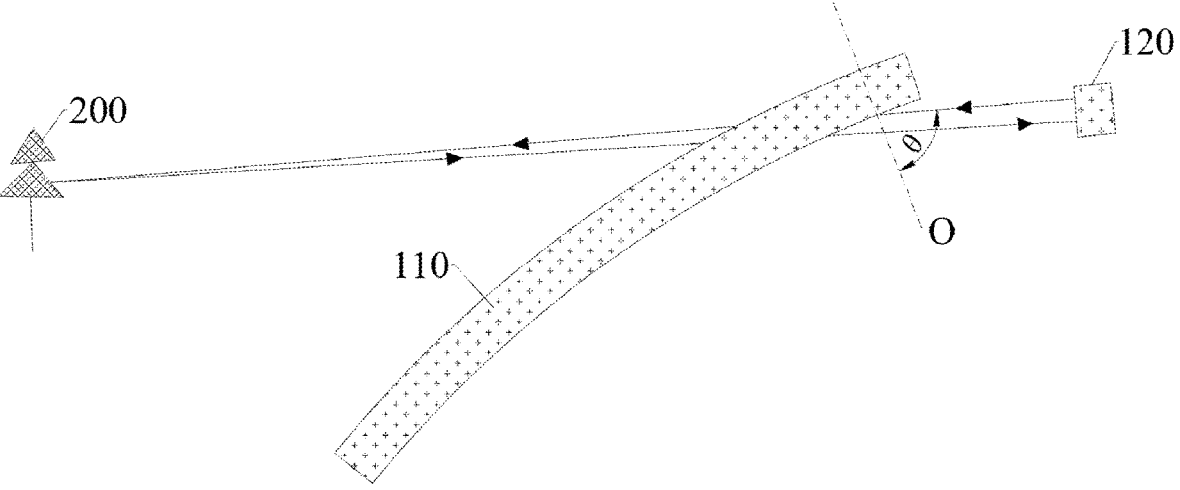
FIG. 2 is a schematic diagram illustrating a path of P-polarized light during operation of a LiDAR system of the automobile in FIG. 1.

Refer to FIG. 2, FIG. 2 is a schematic diagram illustrating a path of the P-polarized light during operation of the LiDAR system 120 of the automobile in FIG. 1. A straight line with a solid arrow in FIG. 2 represents a path of the P-polarized light.

The P-polarized light emitted by the laser emitter of the LiDAR system 120 may pass through the front windshield 110 to reach the target object 200, then part of the P-polarized light may be reflected by the target object 200. The P-polarized light reflected by the target object 200 may pass through the front windshield 110 to return to the LiDAR system 120 and be received by the receiver. This enables the LiDAR system 120 to acquire spatial information, such as a distance and an orientation between the target object 200 and the automobile 100, thereby effectively assisting a driver in safe driving of the automobile 100.

In the embodiments, the front windshield 110 may be in a shape of an arc plate. The front windshield 110 is mounted at an angle of inclination α. An angle of incidence (AOI) θ of the P-polarized light ranges from 54 degrees to 70 degrees, that is, the AOI θ of the P-polarized light ranges from 0.942 rad to 1.222 rad. The AOI θ of the P-polarized light is an included angle between the P-polarized light and a normal O at an incident point of the P-polarized light. Exemplarily, the angle of inclination α of the front windshield 110 and the AOI θ are substantially complementary, that is, a sum of the angle of inclination α and the AOI θ is substantially 90 degrees, that is, the sum of the angle of inclination α and the AOI θ is substantially 1.57 rad.

Figure 3:
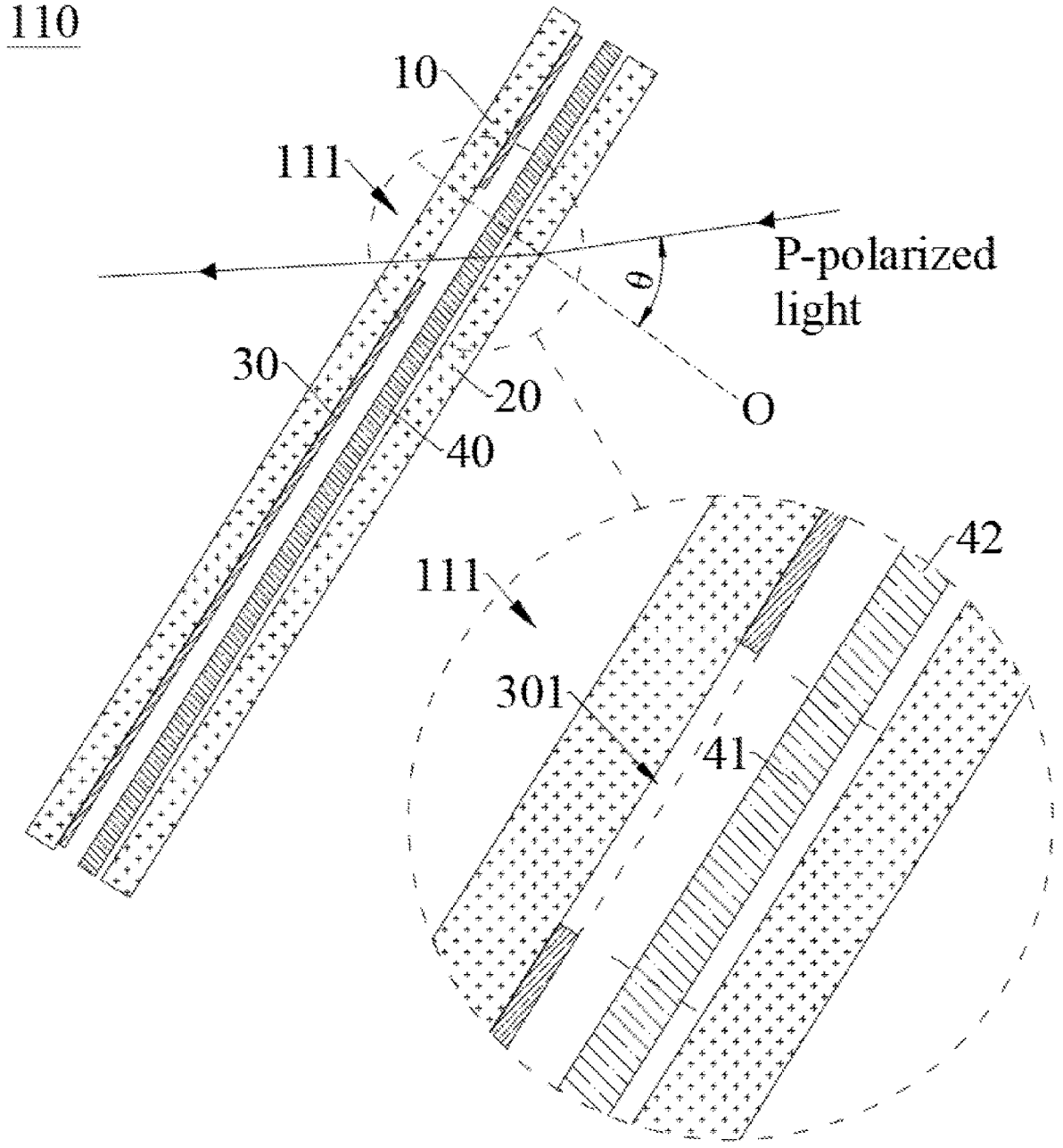
FIG. 3 is a schematic cross-sectional structural view of the front windshield in FIG. 1 according to an embodiment.

Refer to FIG. 3, which is a schematic cross-sectional view of the front windshield 110 in FIG. 1 according to an embodiment.

The front windshield 110 has a signal transmission region 111. The P-polarized light may pass through the signal transmission region 111 of the front windshield 110. In the embodiments, a transmittance of the signal transmission region 111 for the P-polarized light is greater than or equal to 83%. The signal transmission region 111 has a relative tinted coefficient $\alpha_{(\lambda)}$ less than or equal to 0.06 for the P-polarized light incident at the AOI θ, where $\alpha_{(\lambda)} = (TL_{(380\ nm\ to\ 780\ nm)} - TL_{(\lambda)})/TL_{(380\ nm\ to\ 780\ nm)}$. λ is the wavelength of the P-polarized light, $TL_{(\lambda)}$ is a transmittance of the signal transmission region 111 for the P-polarized light with the wavelength λ, and $TL_{(380\ nm\ to\ 780\ nm)}$ is a transmittance of the signal transmission region 111 for P-polarized light of 380 nm to 780 nm, and $TL_{(380\ nm\ to 780\ nm)}$ can be calculated according to the ISO 9050 standard. Further, the signal transmission region 111 has a relative tinted coefficient less than or equal to 0.04 for P-polarized light incident at an AOI of 0 rad.

In the embodiments, the front windshield 110 includes an outer glass layer 10, an inner glass layer 20, a thermal insulation coating 30, and an intermediate adhesive film 40. The outer glass layer 10 is spaced apart from and opposite to the inner glass layer 20. The thermal insulation coating 30 and the intermediate adhesive film 40 are both between the outer glass layer 10 and the inner glass layer 20. The thermal insulation coating 30 is disposed on a surface of the outer glass layer 10 facing the inner glass layer 20. The intermediate adhesive film 40 covers the thermal insulation coating 30. The outer glass layer 10 is a component of the front windshield 110 facing the outside of the automobile 100. The inner glass layer 20 is a component of the front windshield 110 facing the interior of the automobile 100.

Both the outer glass layer 10 and the inner glass layer 20 are ultra-clear glass. A total iron content (calculated by $Fe_2O_3$) of the ultra-clear glass is less than or equal to 0.015 wt %. A visible light transmittance of the ultra-clear glass is greater than or equal to 91%, ensuring the visible light transmittance of the front windshield 110. It is noted that the iron ions in the ultra-clear glass exist in the form of ferric oxide ($Fe_2O_3$) and ferrous oxide (FeO). Both a thickness of the outer glass layer 10 and a thickness of the inner glass layer 20 are less than or equal to 2.3 mm, thereby ensuring the overall strength of the front windshield 110 without increasing the weight of the automobile 100. In addition, the thickness of the outer glass layer 10 may be greater than or equal to the thickness of the inner glass layer 20, thereby ensuring the strength of the outer side of the front windshield 110.

The thermal insulation coating 30 is made of a material with low radiation rate. For example, the thermal insulation coating 30 may be made of fluorine-doped tin oxide (FTO), and in this case, the thermal insulation coating 30 may be formed on the surface of the outer glass layer 10 by depositing FTO through on-line deposition. Alternatively, the thermal insulation coating 30 may be made of indium tin oxide (ITO), and in this case, the thermal insulation coating 30 may be formed on the surface of the outer glass layer 10 by depositing ITO through off-line deposition. Alternatively, the thermal insulation coating may be made of a silver-based material with low emissivity (LOW-E), and in this case, the thermal insulation coating 30 may be formed on the surface of the outer glass layer 10 by depositing a silver-based material with low emissivity through off-line deposition.

A thickness of the thermal insulation coating 30 ranges from 100 nm to 500 nm. A total solar transmittance of the thermal insulation coating 30 is less than or equal to 50%, thereby reducing heat transfer between the inside and outside of the automobile 100, and ensuring the heat insulation effect of the front windshield 110. The visible light transmittance is greater than or equal to 70%, thereby ensuring the visible light transmittance of the front windshield 110.

In the embodiments, the thermal insulation coating 30 is disposed outside the signal transmission region 111. Specifically, the thermal insulation coating 30 defines a light-transmitting hole 301 facing the signal transmission region 111. The light-transmitting hole 301 extends through the thermal insulation coating 30 in a thickness direction of the thermal insulation coating 30. Exemplarily, when deposition and formation of the thermal insulation coating 30 are achieved, part of the thermal insulation coating 30 facing the signal transmission region 111 may be removed by laser engraving. Alternatively, the thermal insulation coating 30 may be deposited and formed by masking, thereby allowing concurrent formation of the light-transmitting hole 301 and the thermal insulation coating 30. The diameter of the light-transmitting hole 301 may be equal to or greater than the diameter of the signal transmission region 111. It can be understood that, due to the nanoscale thickness of the thermal insulation coating 30, the light-transmitting hole 301 may not be visible to naked eyes.

In other embodiments, the front windshield 110 includes an electric heating coating (not illustrated). The electric heating coating is disposed outside the signal transmission region 111. In this case, the front windshield 110 includes the electric heating coating and has a heating power density greater than or equal to 400 $W/m^2$.

The intermediate adhesive film 40 is adhered between the outer glass layer 10 and the inner glass layer 20, thereby achieving the assembly of the outer glass layer 10 and the inner glass layer 20. Exemplarily, the intermediate adhesive film 40 may be filled in the light-transmitting hole 301. In the embodiments, the thickness of the intermediate adhesive film 40 ranges from 0.38 mm to 1.52 mm.

In the embodiments, the intermediate adhesive film 40 is made of at least one of polyvinyl butyral (PVB), ethylene vinyl acetate copolymer, or a sentry glass plus (SGP). Specifically, the intermediate adhesive film 40 defines a first through hole 401 facing the signal transmission region 111. The first through hole 401 may be filled with an infrared high-transmittance material. The infrared high-transmittance material includes at least one of ethylene vinyl acetate copolymer (EVA), polyolefin thermoplastic elastomer (POE), polycarbonate (PC), or polymethyl methacrylate (PMMA). In other embodiments, the first through hole 401 is not filled with any material.

In an embodiment, the intermediate adhesive film 40 includes a light-transmitting portion 41 and an adhesive portion 42. The light-transmitting portion 41 faces the signal transmission region 111 and the light-transmitting hole 301. The light-transmitting portion 41 may be made of the above infrared high-transmittance material. The adhesive portion 42 may be made of at least one of polyvinyl butyral (PVB), ethylene vinyl acetate copolymer, polyolefin thermoplastic elastomers, polycarbonate, or polymethyl methacrylate. It is noted that, the light-transmitting portion 41 faces the light-transmitting hole 301 means that an orthographic projection of the light-transmitting portion 41 on the thermal insulation coating 30 covers the light-transmitting hole 301.

When the P-polarized light is emitted by the laser emitter of the LiDAR system 120 towards the front windshield 110, the P-polarized light passes through the signal transmission region 111 and enters the external environment. That is, the P-polarized light is first incident on the inner glass layer 20, then passes through the light-transmitting portion 41 of the intermediate adhesive film 40 and the light-transmitting hole 301 of the thermal insulation coating 30 in sequence, and finally passes through the outer glass layer 10 to radiate to the outside of the automobile. It can be seen that the material of the light-transmitting portion 41 of the intermediate adhesive film 40 may affect the transmittance of the signal transmission region 111 of the front windshield 110 for P-polarized light.

In an embodiment, the wavelength $\lambda$ of the P-polarized light emitted by the laser emitter of the LiDAR system 120 is 905 nm. The light-transmitting portion 41 is made of polyvinyl butyral. The light-transmitting portion 41 may be integrally formed with the adhesive portion 42. In the embodiments, for the P-polarized light incident on the signal transmission region 111 at the AOI $\theta$ ranging from 0.942 rad to 1.222 rad, the relative tinted coefficient $\alpha_{(905\ nm)}$ of the signal transmission region 111 for the P-polarized light with the wavelength of 905 nm is less than or equal to 0.028. When the AOI $\theta$ of the P-polarized light is 0 rad (i.e., when the P-polarized light is incident perpendicularly), the relative tinted coefficient $\alpha_{(905\ nm)}$ of the signal transmission region 111 for the P-polarized light with the wavelength of 905 nm is less than or equal to 0.02.

It can be seen that, the smaller the relative tinted coefficient $\alpha_{(\lambda)}$ of the signal transmission region 111 for the P-polarized light with the wavelength of $\lambda$, the higher the transmittance of the signal transmission region 111 for the P-polarized light with the wavelength of $\lambda$. In the embodiments, for the P-polarized light with the wavelength of 905 nm and incident on the signal transmission region 111 at various AOIs, the signal transmission region 111 has a small relative tinted coefficient $\alpha_{(905\ nm)}$ for the P-polarized light, and thus the transmittance of the signal transmission region 111 for the P-polarized light with the wavelength of 905 nm is relatively high, thereby satisfying the operation and distance detection requirements of the LiDAR system 120.

Further, a maximum change rate $K_1$ of the relative tinted coefficient $\alpha_{(905\ nm)}$ of the signal transmission region 111 for the P-polarized light with the wavelength of 905 nm and the AOI $\theta$ satisfy $K_1=0.006*\theta+0.008$, where the AOI $\theta$ ranges from 0.942 rad to 1.222 rad. It can be seen that $K_1$ is less than or equal to 0.0153. In other words, a change rate of the relative tinted coefficient $\alpha_{(905\ nm)}$ of the signal transmission region 111 for the P-polarized light with the wavelength of 905 nm and incident at various AOIs $\theta$ is relatively small, the P-polarized light is less dependent on the AOI $\theta$, facilitating adaptability of the P-polarized light incident on the signal transmission region 111 at the AOI $\theta$ of a predetermined angular range. This in turn helps to improve the detection accuracy of the LiDAR system 120.

For example, the front windshield 110 in comparative example 1 and the front windshield 110 in embodiment 1 are taken for illustration, testing is conducted on the transmittance of the signal transmission region 111 of the front windshield 110 for the P-polarized light with the wavelength of 905 nm, and the test results are shown in Table 1 below.

In the front windshield 110 in comparative example 1, both the outer glass layer 10 and the inner glass layer 20 are normal clear glass raw sheets. Both the thickness of the outer glass layer 10 and the thickness of the inner glass layer 20 are 2.1 mm. The intermediate adhesive layer 40 is made of polyvinyl butyral. The thickness of the intermediate adhesive layer 40 is 0.76 mm. For the P-polarized light incident on the signal transmission region 111 at the AOI $\theta$ of 90 degrees (that is, a normal incidence of the P-polarized light), the relative tinted coefficient $\alpha_{(905\ nm)}$ of the signal transmission region 111 of the front windshield 110 in comparative example 1 for the P-polarized light with the wavelength of 905 nm is 0.1421.

In the front windshield 110 in embodiment 1, both the outer glass layer 10 and the inner glass layer 20 are ultraclear glass raw sheets. Both the thickness of the outer glass layer 10 and the thickness of the inner glass layer 20 are 2.1 mm. The intermediate adhesive layer 40 is made of polyvinyl butyral. The thickness of the intermediate adhesive layer 40 is 0.76 mm. For the P-polarized light incident on the signal transmission region 111 at the AOI $\theta$ of 90 degrees (that is, a normal incidence of the P-polarized light), the relative tinted coefficient $\alpha_{(905\ nm)}$ of the signal transmission region 111 of the front windshield 110 in embodiment 1 for the P-polarized light with the wavelength of 905 nm is 0.0152.

TABLE 1 transmittance of the signal transmission region of the front
windshield in comparative example 1 for the P-polarized light
with the wavelength of 905 nm and transmittance of the signal
transmission region of the front windshield in embodiment 1
for the P-polarized light with the wavelength of 905 nm

| | AOI $\theta$ (rad) | Relative tinted coefficient $\alpha_{(905\ nm)}$ | Maximum change rate $K_1$ of the relative tinted coefficient | Transmittance of P-polarized light | Result |
|---|---|---|---|---|---|
| Comparative example 1 | 0.942 | 0.1682 | 0.0460 | 79.6% | NG |
| | 1.047 | 0.1736 | 0.0500 | 78.5% | NG |
| | 1.222 | 0.1827 | 0.0566 | 70.4% | NG |
| Embodiment 1 | 0.942 | 0.0231 | 0.0107 | 94.8% | GOOD |
| | 1.047 | 0.0245 | 0.0113 | 93.9% | GOOD |
| | 1.222 | 0.0258 | 0.0122 | 84.4% | OK |

In Table 1 above, the evaluation criteria are defined as follows. A transmittance for P-polarized light less than 83% is considered as negative (NG), a transmittance for P-polarized light greater than or equal to 83% and less than 90% is considered as okay (OK), and a transmittance for P-polarized light greater than or equal to 90% is considered as good (GOOD). It is noted that conventional LiDAR systems require a transmittance of at least 83% for P-polarized light, and in some cases, even 90%.

As can be seen from Table 1, a transmittance of the front windshield 110 in embodiment 1 for the P-polarized light with the wavelength of 905 nm is greater than that of the front windshield 110 in comparative example 1. In other words, both the outer glass layer 10 and the inner glass layer 20 are made of ultra-clear glass raw sheets, which is beneficial to improving the transmittance of the front windshield 110 for the P-polarized light with the wavelength of 905 nm.

Figure 4:
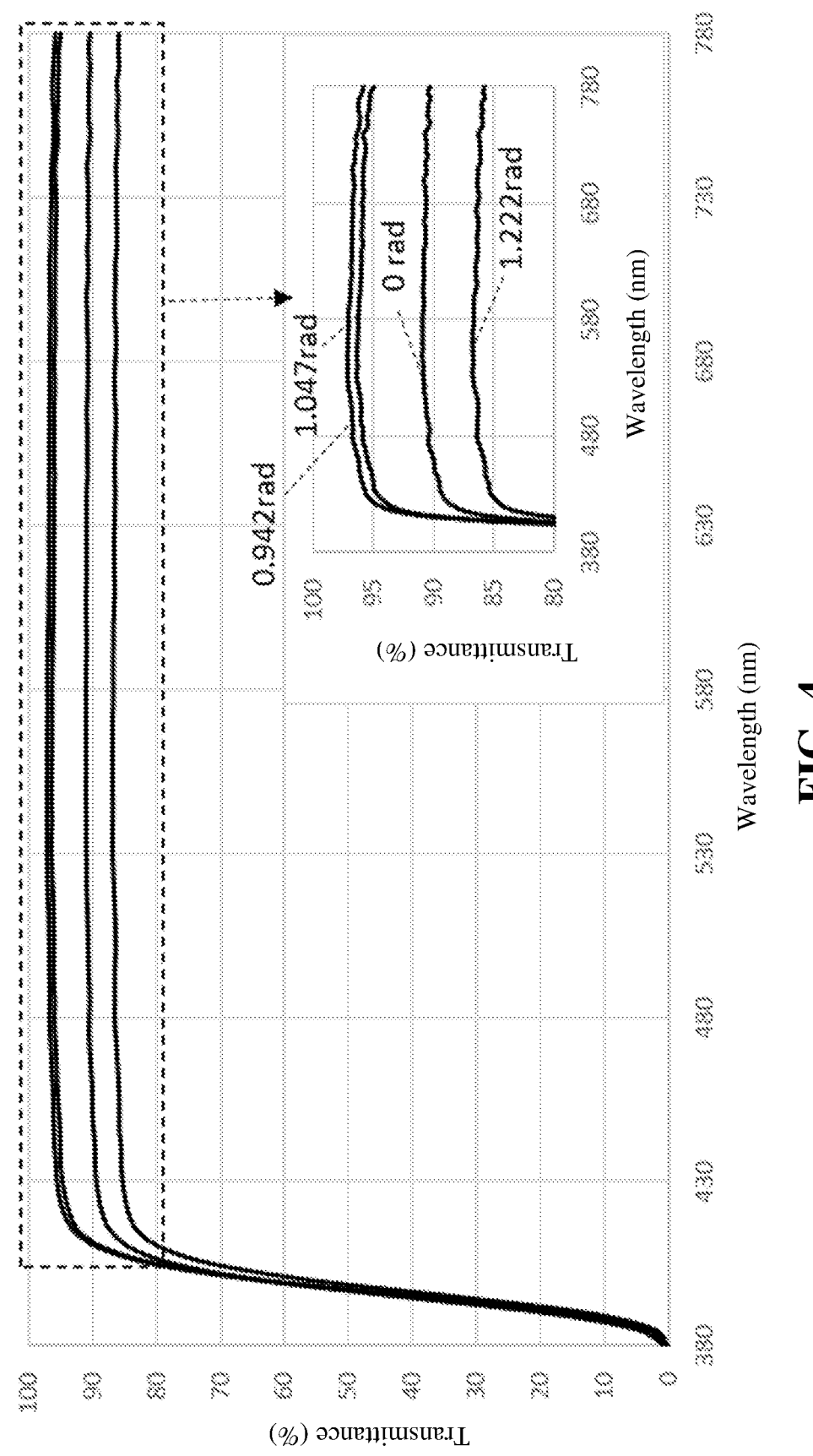
FIG. 4 illustrates curves of a transmittance of a signal transmission region of a front windshield in embodiment 1 for P-polarized light incident at various AOIs, where a wavelength of the P-polarized light ranges from 380 nm to 780 nm.

As illustrated in FIGS. 4 and 5, FIG. 4 illustrates curves of the transmittance of the signal transmission region of the front windshield in embodiment 1 for P-polarized light incident at various AOIs, where a wavelength of the P-polarized light ranges from 380 nm to 780 nm, and FIG. 5 illustrates curves of a transmittance of the signal transmission region of the front windshield in embodiment 1 for P-polarized light incident at various AOIs, where a wavelength of the P-polarized light ranges from 800 nm to 1600 nm. In FIGS. 4 and 5, the abscissa represents the wavelength of the P-polarized light, the ordinate represents the transmittance for the P-polarized light, and the AOIs include 0 rad, 0.942 rad, 1.047 rad, and 1.222 rad.

It can be seen from FIG. 5 that, when the wavelength of the P-polarized light is in the range of 800 nm to 1600 nm, a transmittance of the signal transmission region 111 of the front windshield 110 in comparative example 1 for the P-polarized light is substantially equal to or less than 80%, while a transmittance of the signal transmission region 111 of the front windshield 110 in embodiment 1 for the P-polarized light is substantially equal to or greater than 83%, and even ranges from 90% to 95% for P-polarized light within some wavelength ranges. In some embodiments, the relative tinted coefficient $\alpha_{(905\ nm)}$ is less than or equal to 0.025 and the maximum change rate $K_1$ of the relative tinted coefficient is less than or equal to 0.012. It can be seen that, both the outer glass layer 10 and the inner glass layer 20 are made of ultra-clear glass raw sheets, which is further beneficial to improving the transmittance of the signal transmission region 111 of the front windshield 110 for P-polarized light.

In another embodiment, the wavelength of the P-polarized light emitted by the laser emitter of the LiDAR system 120 is 1550 nm. The infrared high-transmittance material of the light-transmitting portion 41 includes at least one of ethylene vinyl acetate copolymer, polyolefin thermoplastic elastomer, polycarbonate, or polymethyl methacrylate. In some other embodiments, the adhesive portion 42 may also be made of the same material as the light-transmitting portion 41. The adhesive portion 42 may be integrally formed with the light-transmitting portion 41. In the embodiments, when the AOI $\theta$ of the P-polarized light ranges from 0.942 rad to 1.222 rad, the relative tinted coefficient $\alpha_{(1550\ nm)}$ of the signal transmission region 111 for the P-polarized light with a wavelength of 1550 nm is less than or equal to 0.035. In a case where the AOI $\theta$ of the P-polarized light is equal to 0 rad (i.e., when the P-polarized light is incident perpendicularly), the relative tinted coefficient $\alpha_{(1550\ nm)}$ of the signal transmission region 111 for the P-polarized light with the wavelength of 1550 nm is less than or equal to 0.02.

In the embodiments, for the P-polarized light with the wavelength of 1550 nm and incident on the signal transmission region 111 at various AOIs $\theta$, the relative tinted coefficient $\alpha_{(1550\ nm)}$ of the signal transmission region 111 for the P-polarized light with the wavelength of 1550 nm is relatively small, and thus a transmittance of the signal transmission region 111 for the P-polarized light with the wavelength of 1550 nm is relatively high, thereby satisfying the operation and distance detection requirements of the LiDAR system 120.

Further, the maximum change rate $K_2$ of the relative tinted coefficient $\alpha_{(1550\ nm)}$ of the signal transmission region 111 for the P-polarized light with the wavelength of 1550 nm and the AOI $\theta$ satisfy $K_2=0.02*\theta+0.002$, where the AOI $\theta$ ranges from 0.942 rad to 1.222 rad. It can be seen that $K_2$ is less than or equal to 0.0264. In other words, for the P-polarized light with the wavelength of 905 nm and incident on the signal transmission region 111 at various AOIs $\theta$, a change rate of the relative tinted coefficient $\alpha_{(1550\ nm)}$ of the signal transmission region 111 for the P-polarized light is relatively small, the P-polarized light is less dependent on the AOI $\theta$, facilitating adaptability of the P-polarized light incident on the signal transmission region 111 at AOI $\theta$ of a predetermined angular range. This in turn helps to improve the detection accuracy of the LiDAR system 120.

For example, the front windshield 110 in comparative example 2 and the front windshield 110 in embodiment 2 are taken for illustration, testing is conducted on the transmittance of the signal transmission region 111 of the front windshield 110 for the P-polarized light with the wavelength of 1550 nm, and the test results are shown in Table 2 below.

In the front windshield 110 in comparative example 2, both the outer glass layer 10 and the inner glass layer 20 are normal clear glass raw sheets. Both the thickness of the outer glass layer 10 and the thickness of the inner glass layer 20 are 2.1 mm. The intermediate adhesive layer 40 is made of polyvinyl butyral. The thickness of the intermediate adhesive layer 40 is 0.76 mm. For the P-polarized light incident on the signal transmission region 111 at the AOI $\theta$ of 90 degrees (that is, a normal incidence of the P-polarized light), the relative tinted coefficient $\alpha_{(1550\ nm)}$ of the signal transmission region 111 of the front windshield 110 in comparative example 2 for the P-polarized light with the wavelength of 1550 nm is 0.1361.

In the front windshield 110 in embodiment 2, both the outer glass layer 10 and the inner glass layer 20 are ultra-clear glass raw sheets. Both the thickness of the outer glass layer 10 and the thickness of the inner glass layer 20 are 2.1 mm. The light-transmitting portion 41 of the intermediate adhesive layer 40 is made of ethylene vinyl acetate copolymer. The thickness of the intermediate adhesive layer 40 is 0.76 mm. For the P-polarized light incident on the signal transmission region 111 at the AOI $\theta$ of 90 degrees (that is, a normal incidence of the P-polarized light), the relative tinted coefficient $\alpha_{(1550\ nm)}$ of the signal transmission region 111 of the front windshield 110 in embodiment 2 for the P-polarized light with the wavelength of 1550 nm is 0.0178.

TABLE 2 transmittance of the signal transmission region of the front
windshield in comparative example 2 for the P-polarized light
with the wavelength of 1550 nm and transmittance of the signal
transmission region of the front windshield in embodiment 2
for the P-polarized light with the wavelength of 1550 nm

| | AOI θ (rad) | Relative tinted coefficient $\alpha_{(1550\,nm)}$ | Maximum change rate $K_2$ of the relative tinted coefficient | Transmittance of P-polarized light | Result |
|---|---|---|---|---|---|
| Comparative example 2 | 0.942 | 0.1638 | 0.0492 | 80.0% | NG |
| | 1.047 | 0.1689 | 0.0537 | 79.0% | NG |
| | 1.222 | 0.1785 | 0.0612 | 70.8% | NG |
| Embodiment 2 | 0.942 | 0.0294 | 0.0198 | 93.5% | GOOD |
| | 1.047 | 0.0256 | 0.0218 | 92.9% | GOOD |
| | 1.222 | 0.0335 | 0.0251 | 83.3% | OK |

In Table 2 above, the evaluation criteria are defined as
follows. A transmittance for P-polarized light less than 83%
is considered as negative (NG), a transmittance for P-polar-
ized light greater than or equal to 83% and less than 90% is
considered as okay (OK), and a transmittance for P-polar-
ized light greater than or equal to 90% is considered as good
(GOOD).

As can be seen from Table 2, a transmittance of the front
windshield 110 in embodiment 2 for the P-polarized light
with the wavelength of 1550 nm is greater than that of the
front windshield 110 in comparative example 2. In other
words, both the outer glass layer 10 and the inner glass layer
20 are made of ultra-clear glass raw sheets, and the light-
transmitting portion 41 of the intermediate adhesive film 40
is made of ethylene vinyl acetate copolymer, which is
beneficial to improving the transmittance of the front wind-
shield 110 for P-polarized light with the wavelength of 1550
nm.

As can be seen from Table 2, the transmittance of the
signal transmission region 111 of the front windshield 110 in
comparative example 2 for the P-polarized light with the
wavelength of 1550 nm is substantially equal to or less than
80%, while the transmittance of the signal transmission
region 111 of the front windshield 110 in embodiment 2 for
the P-polarized light is substantially equal to or greater than
83%, and even ranges from 90% to 95% for P-polarized
light within some wavelength ranges. In some embodiments,
the relative tinted coefficient $\alpha_{(1550\,nm)}$ is less than or equal
to 0.026 and the maximum change rate $K_2$ of the relative
tinted coefficient is less than or equal to 0.022. It can be seen
that, both the outer glass layer 10 and the inner glass layer
20 are made of ultra-clear glass raw sheets, and the light-
transmitting portion 41 of the intermediate adhesive film 40
is made of the ethylene vinyl acetate copolymer, which is
further beneficial to improving the transmittance of the
signal transmission region 111 of the front windshield 110
for P-polarized light.

Refer to FIG. 6, which is a schematic cross-sectional view
of the front windshield 110 in FIG. 1 according to another
embodiment.

The front windshield 110 in FIG. 6 is the substantially the
same as the front windshield 110 in the foregoing embodi-
ments, except that the outer glass layer 10 may be made of
clear glass or ultra-clear glass, and the inner glass layer 20
may be made of clear glass or tinted glass. A total iron
content of the clear glass is less than or equal to 0.08 wt %,
and a visible light transmittance of the clear glass is greater
than or equal to 88%, thereby ensuring the visible light transmittance of the front windshield 110. The total iron
content of the ultra-clear glass is less than or equal to 0.015
wt %, and a visible light transmittance of the ultra-clear
glass is greater than or equal to 91%. A total iron content of
the tinted glass is greater than or equal to 0.5 wt %. A visible
light transmittance of the tinted glass is greater than 70%.

In addition, the intermediate adhesive film 40 defines the
first through hole 401. The first through hole 401 faces the
signal transmission region 111 and is in communication with
the light-transmitting hole 301. The first through hole 401 is
not filled with any material. An inner diameter of the first
through hole 401 is smaller than an inner diameter of the
light-transmitting hole 301, thereby preventing the thermal
insulation coating 30 from being exposed to the air, protect-
ing the thermal insulation coating 30, preventing silver ions
in the thermal insulation coating 30 from reacting with the
air, and ensuring a heat insulation effect of the thermal
insulation coating 30. A central axis of the first through hole
401 is coaxial with a central axis of the light-transmitting
hole 301. A distance a between a wall of the first through
hole 401 and a wall of the light-transmitting hole 301 is
greater than or equal to 3 mm.

In some embodiments, the first through hole 401 may also
be filled with an infrared high-transmittance material. The
infrared high-transmittance material may include at least one
of ethylene vinyl acetate copolymer, a polyolefin thermo-
plastic elastomer, polycarbonate, or polymethyl methacry-
late.

The inner glass layer 20 defines a second through hole
201. The second through hole 201 is in communication with
the first through hole 401. A central axis of the second
through hole 201 is coaxial with a central axis of the first
through hole 401. A distance b between a wall of the second
through hole 201 and the wall of the first through hole 401
is greater than or equal to −1 mm and less than or equal to
2 mm. A sum of a and b may be greater than or equal to 3
mm. In other embodiments, the distance b between a wall of
the second through hole 201 and the wall of the first through
hole 401 is greater than or equal to 1 mm and less than or
equal to 2 mm.

When the P-polarized light is emitted by the laser emitter
of the LiDAR system 120 towards the front windshield 110,
the P-polarized light is incident through the second through
hole 201 of the inner glass layer 20, then passes through the
first through hole 401 of the intermediate adhesive film 40
and the light-transmitting hole 301 of the thermal insulation
coating 30 in sequence, and finally passes through the outer
glass layer 10 to radiate to the outside of the automobile. It
can be seen that the material of the outer glass layer 10 may
affect the transmittance of the signal transmission region 111
of the front windshield 110 for P-polarized light.

In an embodiment, a wavelength of the P-polarized light
emitted by the laser emitter of the LiDAR system 120 is 905
nm. In the embodiments, for the P-polarized light incident
on the signal transmission region 111 at the AOI θ ranges
from 0.942 rad to 1.222 rad, the relative tinted coefficient
$\alpha_{(905\,nm)}$ of the signal transmission region 111 for the
P-polarized light with the wavelength of 905 nm is less than
or equal to 0.05. When the AOI θ of the P-polarized light is
0 rad (i.e., when the P-polarized light is incident perpen-
dicularly), the relative tinted coefficient $\alpha_{(905\,nm)}$ of the
signal transmission region 111 for the P-polarized light with
the wavelength of 905 nm is less than or equal to 0.04. It can
be seen that, for the P-polarized light with the wavelength of
905 nm and incident on the signal transmission region 111
at various AOIs, the signal transmission region 111 has a
small relative tinted coefficient $\alpha_{(905\,nm)}$ for the P-polarized light, and thus the transmittance of the signal transmission region 111 for the P-polarized light with the wavelength of 905 nm is relatively high, thereby satisfying the operation and distance detection requirements of the LiDAR system 120.

Further, a maximum change rate $K_3$ of the relative tinted coefficient $\alpha_{(905\ nm)}$ of the signal transmission region 111 for the P-polarized light with the wavelength of 905 nm and the AOI $\theta$ satisfy $K_3=0.015*\theta+0.0035$, where the AOI $\theta$ ranges from 0.942 rad and 1.222 rad. It can be seen that $K_3$ is less than or equal to 0.0218. In other words, a change rate of the relative tinted coefficient $\alpha_{(905\ nm)}$ of the signal transmission region 111 for the P-polarized light with the wavelength of 905 nm and incident at various AOIs $\theta$ is relatively small, the P-polarized light is less dependent on the AOI $\theta$, facilitating adaptability of the P-polarized light incident on the signal transmission region 111 at the AOI $\theta$ of a predetermined angular range.

For example, the front windshield 110 in embodiment 3 and the front windshield 110 in embodiment 4 are taken for illustration, testing is conducted on the transmittance of the signal transmission region 111 of the front windshield 110 for the P-polarized light with the wavelength of 905 nm, and the test results are shown in Table 3 below.

In the front windshield 110 in embodiment 3, the outer glass layer 10 is made of a clear glass. In the front windshield 110 in embodiment 4, the outer glass layer 10 is made of an ultra-clear glass. The thickness of the outer glass layer 10 is 2.1 mm. For the P-polarized light incident on the signal transmission region 111 at the AOI $\theta$ of 90 degrees (that is, a normal incidence of the P-polarized light), the relative tinted coefficient $\alpha_{(905\ nm)}$ of the signal transmission region 111 of the front windshield 110 in embodiment 4 for the P-polarized light with the wavelength of 905 nm is 0.0045.

TABLE 3 transmittance of the signal transmission region of the front windshield in embodiment 3 for the P-polarized light with the wavelength of 905 nm and transmittance of the signal transmission region of the front windshield in embodiment 4 for the P-polarized light with the wavelength of 905 nm

| | AOI $\theta$ (rad) | Relative tinted coefficient $\alpha_{(905\ nm)}$ | Maximum change rate $K_3$ of the relative tinted coefficient | Transmittance of P-polarized light | Result |
|---|---|---|---|---|---|
| Embodiment 3 | 1.047 | 0.0473 | 0.0162 | 93.9% | GOOD |
| | 1.152 | 0.0488 | 0.0175 | 90.4% | GOOD |
| | 1.222 | 0.0500 | 0.0183 | 85.2% | OK |
| Embodiment 4 | 1.047 | 0.0075 | 0.0126 | 97.6% | GOOD |
| | 1.152 | 0.0099 | 0.0141 | 94.1% | GOOD |
| | 1.222 | 0.0101 | 0.0151 | 88.9% | OK |

In Table 3 above, the evaluation criteria are defined as follows. A transmittance for P-polarized light less than 83% is considered as negative (NG), a transmittance for P-polarized light greater than or equal to 83% and less than 90% is considered as okay (OK), and a transmittance for P-polarized light greater than or equal to 90% is considered as good (GOOD).

As can be seen from Table 3, a transmittance of the front windshield 110 in embodiment 3 for the P-polarized light with the wavelength of 905 nm is equal to or greater than 85%, even 95%, and a transmittance of the front windshields 110 in embodiment 4 for the P-polarized light with the wavelength of 905 nm is equal to or greater than 85%, even 95%. In some embodiments, the relative tinted coefficient $\alpha_{(905\ nm)}$ is less than or equal to 0.049, and the maximum change rate $K_3$ of the relative tinted coefficient is less than or equal to 0.018. In some embodiments, the relative tinted coefficient $\alpha_{(905\ nm)}$ is less than or equal to 0.01, and the maximum change rate $K_3$ of the relative tinted coefficient is less than or equal to 0.015. Compared with comparative example 2, the first through hole 401 and the second through hole 201 are set in embodiment 3 and embodiment 4 to improve the transmittance of the front windshield 110 for the P-polarized light with the wavelength of 905 nm.

In another embodiment, the wavelength of the P-polarized light emitted by the laser emitter of the LiDAR system 120 is 1550 nm. When the AOI $\theta$ of the P-polarized light ranges from 0.942 rad to 1.222 rad, the relative tinted coefficient $\alpha_{(1550\ nm)}$ of the signal transmission region 111 for the P-polarized light with the wavelength of 1550 nm is less than or equal to 0.06. In a case where the AOI $\theta$ of the P-polarized light is equal to 0 rad (i.e., when the P-polarized light is incident perpendicularly), the relative tinted coefficient $\alpha_{(1550\ nm)}$ of the signal transmission region 111 for the P-polarized light with the wavelength of 1550 nm is less than or equal to 0.04.

In the embodiments, for the P-polarized light with the wavelength of 1550 nm and incident on the signal transmission region 111 at various AOIs $\theta$, the relative tinted coefficient $\alpha_{(1550\ nm)}$ of the signal transmission region 111 for the P-polarized light with the wavelength of 1550 nm is relatively small, and thus a transmittance of the signal transmission region 111 for the P-polarized light with the wavelength of 1550 nm is relatively high, thereby satisfying the operation and distance detection requirements of the LiDAR system 120.

Further, the maximum change rate $K_4$ of the relative tinted coefficient $\alpha_{(1550\ nm)}$ of the signal transmission region 111 for the P-polarized light with the wavelength of 1550 nm and the AOI $\theta$ satisfy $K_4=0.028*\theta-0.001$, where the AOI $\theta$ ranges from 0.942 rad to 1.222 rad. It can be seen that $K_4$ is less than or equal to 0.0332. In other words, for the P-polarized light with the wavelength of 905 nm and incident on the signal transmission region 111 at various AOIs $\theta$, a change rate of the relative tinted coefficient $\alpha_{(1550\ nm)}$ of the signal transmission region 111 for the P-polarized light is relatively small, the P-polarized light is less dependent on the AOI $\theta$, facilitating adaptability of the P-polarized light incident on the signal transmission region 111 at AOI $\theta$ of a predetermined angular range. This in turn helps to improve the detection accuracy of the LiDAR system 120.

For example, the front windshield 110 in embodiment 5 and the front windshield 110 in embodiment 6 are taken for illustration, testing is conducted on the transmittance of the signal transmission region 111 of the front windshield 110 for the P-polarized light with the wavelength of 1550 nm, and the test results are shown in Table 4 below. The outer glass layer 10 in embodiment 5 is made of a clear glass, and the outer glass layer 10 in embodiment 6 is made of an ultra-clear glass. For the P-polarized light incident on the signal transmission region 111 at the AOI $\theta$ of 90 degrees (that is, a normal incidence of the P-polarized light), the relative tinted coefficient $\alpha_{(1550\ nm)}$ of the signal transmission region 111 of the front windshield 110 in embodiment 5 for the P-polarized light with the wavelength of 1550 nm is 0.0383. For the P-polarized light incident on the signal transmission region 111 at the AOI $\theta$ of 90 degrees (that is, a normal incidence of the P-polarized light), the relative tinted coefficient $\alpha_{(1550\ nm)}$ of the signal transmission region 111 of the front windshield 110 in embodiment 6 for the P-polarized light with the wavelength of 1550 nm is 0.0006.

TABLE 4 transmittance of the signal transmission region of the front windshield in embodiment 5 for the P-polarized light with the wavelength of 1550 nm and transmittance of the signal transmission region of the front windshield in embodiment 6 for the P-polarized light with the wavelength of 1550 nm

| | AOI θ (rad) | Relative tinted coefficient $\alpha_{(1550\ nm)}$ | Maximum change rate $K_4$ of the relative tinted coefficient | Transmittance of P-polarized light | Result |
|---|---|---|---|---|---|
| Embodiment 5 | 1.047 | 0.0517 | 0.0268 | 92.8% | GOOD |
| | 1.152 | 0.0547 | 0.0296 | 89.4% | GOOD |
| | 1.222 | 0.0564 | 0.0315 | 84.5% | OK |
| Embodiment 6 | 1.047 | 0.0075 | 0.0189 | 97.8% | GOOD |
| | 1.152 | 0.0099 | 0.0214 | 94.3% | GOOD |
| | 1.222 | 0.0101 | 0.0230 | 89.1% | OK |

In Table 4, the evaluation criteria are defined as follows. A transmittance for P-polarized light less than 83% is considered as negative (NG), a transmittance for P-polarized light greater than or equal to 83% and less than 90% is considered as okay (OK), and a transmittance for P-polarized light greater than or equal to 90% is considered as good (GOOD).

As can be seen from Table 4, a transmittance of the front windshield 110 in embodiment 5 for the P-polarized light with the wavelength of 1550 nm is equal to or greater than 83%, even 95%, and a transmittance of the front windshields 110 in embodiment 6 for the P-polarized light with the wavelength of 1550 nm is equal to or greater than 83%, even 95%. In some embodiments, the relative tinted coefficient $\alpha_{(1550\ nm)}$ is less than or equal to 0.055, and the maximum change rate $K_4$ of the relative tinted coefficient is less than or equal to 0.03. In some embodiments, the relative tinted coefficient $\alpha_{(1550\ nm)}$ is less than or equal to 0.01, and the maximum change rate $K_4$ of the relative tinted coefficient is less than or equal to 0.022. Compared with comparative example 2, the first through hole 401 and the second through hole 201 are set in embodiment 5 and embodiment 6 to improve the transmittance of the front windshield 110 for the P-polarized light with the wavelength of 1550 nm.

As illustrated in FIG. 7 and FIG. 8, FIG. 7 illustrates curves of the transmittance of the signal transmission region of the front windshield in embodiment 4 for P-polarized light incident at various AOIs and curves of the transmittance of the signal transmission region of the front windshield in embodiment 6 for P-polarized light incident at various AOIs, where a wavelength of the P-polarized light ranges from 380 nm to 780 nm, and FIG. 8 illustrates curves of the transmittance of the signal transmission region of the front windshield in embodiment 4 for P-polarized light incident at various AOIs and curves of the transmittance of the signal transmission region of the front windshield in embodiment 6 for P-polarized light incident at various AOIs, where a wavelength of the P-polarized light ranges 800 nm to 1600 nm. The abscissa represents the wavelength of the P-polarized light, the ordinate represents the transmittance for the P-polarized light, and the AOIs include 0 rad, 0.942 rad, 1.047 rad, and 1.222 rad.

It can be seen from FIG. 8 that, in a case where the wavelength of the P-polarized light is in the range of 800 nm to 1600 nm, the transmittance of the signal transmission region 111 of the front windshield 110 in embodiment 4 for the P-polarized light is substantially equal to or greater than 88%, and even 95%, and the transmittance of the signal transmission region 111 of the front windshield 110 in embodiment 6 for the P-polarized light is substantially equal to or greater than 88%, and even 95%. It can be seen that, the front windshield 110 defines the first through hole 401 and the second through hole 201, which is beneficial to improving the transmittance of the front windshield 110 for the P-polarized light with wavelength of 905 nm and the P-polarized light with wavelength of 1550 nm incident at an AOI, where the AOI includes 0 rad, 0.942 rad, 1.047 rad, and 1.222 rad.

In the automobile 100 provided in the embodiments of the disclosure, the LiDAR system 120 is mounted to the inside of the automobile 100, and the design of the front windshield 110 in structure and material aims to reduce the absorption and reflection attenuation of the front windshield 110 for the P-polarized light, ensuring high transmittance of the front windshield 110 for the P-polarized light. This design prevents the operational efficiency of the LiDAR system 120 from being adversely affected, guaranteeing the detection range of the LiDAR system and the normal operation of the LiDAR, enhancing the detection precision of the LiDAR system, and ensuring the aesthetic appearance of the automobile. In addition, the front windshield 110 can also be cleaned by a wiper system which is intrinsic to the automobile 100, thereby improving the transparency of a detection light path of the LiDAR system 120.

The foregoing descriptions are merely specific embodiments of the disclosure, but are not intended to limit the scope of protection of the disclosure. Any variation or replacement readily figured out by a person skilled in the art within the technical scope disclosed in the disclosure shall belong to the scope of protection of the disclosure. Therefore, the scope of protection of the disclosure shall be subject to the scope of protection of said claims.

What is claimed is:

1. A front windshield, mountable to an automobile and operable in cooperation with a LiDAR system inside the automobile, the LiDAR system being configured to emit and/or receive P-polarized light, and a wavelength λ of the P-polarized light ranging from 800 nm to 1600 nm; wherein the front windshield comprises an outer glass layer, an inner glass layer, and an intermediate adhesive film between the outer glass layer and the inner glass layer and has a signal transmission region, wherein the P-polarized light is incident on the signal transmission region at an angle of incidence (AOI) θ ranging from 0.942 rad to 1.222 rad, the signal transmission region has a transmittance greater than or equal to 83% for the P-polarized light incident on the signal transmission region, and the signal transmission region has a relative tinted coefficient $\alpha_{(\lambda)}$ less than or equal to 0.06 for the P-polarized light incident at the AOI θ, wherein $\alpha_{(\lambda)} = (TL_{(380\ nm\ to\ 780\ nm)} - TL_{(\lambda)})/TL_{(380\ nm\ to\ 780\ nm)}$; $TL_{(380\ nm\ to\ 780\ nm)}$ is a transmittance of the signal transmission region for P-polarized light of 380 nm to 780 nm, and $TL_{(\lambda)}$ is a transmittance of the signal transmission region for the P-polarized light with the wavelength λ.

2. The front windshield of claim 1, wherein the signal transmission region has a relative tinted coefficient less than or equal to 0.04 for P-polarized light incident at an AOI of 0 rad.

3. The front windshield of claim 1, wherein the wavelength $\lambda$ of the P-polarized light is equal to 905 nm, and the relative tinted coefficient $\alpha_{(905\ nm)}$ is less than or equal to 0.028.

4. The front windshield of claim 3, wherein a maximum change rate $K_1$ of the relative tinted coefficient $\alpha_{(905\ nm)}$ and the AOI $\theta$ satisfy $K_1$=0.006*$\theta$+0.008.

5. The front windshield of claim 1, wherein the wavelength $\lambda$ of the P-polarized light is equal to 1550 nm, and the relative tinted coefficient $\alpha_{(1550\ nm)}$ is less than or equal to 0.035.

6. The front windshield of claim 5, wherein a maximum change rate $K_2$ of the relative tinted coefficient $\alpha_{(1550\ nm)}$ and the AOI $\theta$ satisfy $K_2$=0.02*$\theta$+0.002.

7. The front windshield of claim 1, further comprising a thermal insulation coating or an electric heating coating, wherein thermal insulation coating or the electric heating coating is positioned between the outer glass layer and the inner glass layer, and the thermal insulation coating or the electric heating coating is disposed outside the signal transmission region.

8. The front windshield of claim 7, wherein the front windshield comprises the thermal insulation coating and has a total solar transmittance less than or equal to 50%; or the front windshield comprises the electric heating coating and has a heating power density greater than or equal to 400 W/m².

9. The front windshield of claim 1, wherein the intermediate adhesive film is made of at least one of polyvinyl butyral, ethylene vinyl acetate copolymer, or a sentry glass plus (SGP).

10. The front windshield of claim 1, wherein both the outer glass layer and the inner glass layer are made of ultra-clear glass, a total iron content of the ultra-clear glass is less than or equal to 0.015 wt %, and a visible light transmittance of the ultra-clear glass is greater than or equal to 91%.

11. The front windshield of claim 10, wherein the intermediate adhesive film defines a first through hole facing the signal transmission region, the first through hole is not filled with any material or is filled with an infrared high-transmittance material, and the infrared high-transmittance material comprises at least one of ethylene vinyl acetate copolymer, polyolefin thermoplastic elastomer, polycarbonate, or polymethyl methacrylate.

12. The front windshield of claim 10, wherein the signal transmission region has a relative tinted coefficient less than or equal to 0.02 for P-polarized light incident at an AOI of 0 rad.

13. The front windshield of claim 1, wherein the outer glass layer is made of clear glass or ultra-clear glass, the inner glass layer is made of clear glass or tinted glass, and the inner glass layer defines a second through hole facing the signal transmission region; a total iron content of the clear glass is less than or equal to 0.08 wt %, and a visible light transmittance of the clear glass is greater than or equal to 88%; the total iron content of the ultra-clear glass is less than or equal to 0.015 wt %, and a visible light transmittance of the ultra-clear glass is greater than or equal to 91%; and a total iron content of the tinted glass is greater than or equal to 0.5 wt %, and a visible light transmittance of the tinted glass is greater than 70%.

14. The front windshield of claim 13, wherein the intermediate adhesive film defines a first through hole facing the signal transmission region, the first through hole is not filled with any material or is filled with an infrared high-transmittance material, and the infrared high-transmittance material comprises at least one of ethylene vinyl acetate copolymer, polyolefin thermoplastic elastomer, polycarbonate, or polymethyl methacrylate.

15. The front windshield of claim 14, wherein a central axis of the first through hole is coaxial with a central axis of the second through hole, and a distance between a wall of the second through hole and a wall of the first through hole is b, wherein −1 mm≤b≤2 mm.

16. The front windshield of claim 13, wherein the wavelength $\lambda$ of the P-polarized light is equal to 905 nm, and the relative tinted coefficient $\alpha_{(905\ nm)}$ is less than or equal to 0.05.

17. The front windshield of claim 16, wherein a maximum change rate $K_3$ of the relative tinted coefficient $\alpha_{(905\ nm)}$ and the AOI $\theta$ satisfy $K_3$=0.015*$\theta$+0.0035.

18. The front windshield of claim 13, wherein the wavelength $\lambda$ of the P-polarized light is equal to 1550 nm, and the relative tinted coefficient $\alpha_{(1550\ nm)}$ is less than or equal to 0.06.

19. The front windshield of claim 18, wherein a maximum change rate $K_4$ of the relative tinted coefficient $\alpha_{(1550\ nm)}$ and the AOI $\theta$ satisfy: $K_4$=0.028*$\theta$−0.001.

20. An automobile, comprising a LiDAR system and a front windshield operable in cooperation with a LiDAR system inside the automobile, the LiDAR system being inside the automobile and configured to emit and/or receive the P-polarized light, and a wavelength of the P-polarized light ranging from 800 nm to 1600 nm, wherein the front windshield comprises an outer glass layer, an inner glass layer, and an intermediate adhesive film between the outer glass layer and the inner glass layer and has a signal transmission region, wherein the P-polarized light is incident on the signal transmission region at an angle of incidence (AOI) $\theta$ ranging from 0.942 rad to 1.222 rad, the signal transmission region has a transmittance greater than or equal to 83% for the P-polarized light incident on the signal transmission region, and the signal transmission region has a relative tinted coefficient $\alpha_{(\lambda)}$ less than or equal to 0.06 for the P-polarized light incident at the AOI $\theta$, wherein $\alpha_{(\lambda)}$= $(TL_{(380\ nm\ to\ 780\ nm)}-TL_{(\lambda)})/TL_{(380\ nm\ to\ 780\ nm)}$, $TL_{(380\ nm\ to\ 780\ nm)}$ is a transmittance of the signal transmission region for P-polarized light of 380 nm to 780 nm, and $TL_{(\lambda)}$ is a transmittance of the signal transmission region for the P-polarized light with the wavelength $\lambda$.

* * * * *